United States Patent Office 3,317,963
Patented May 9, 1967

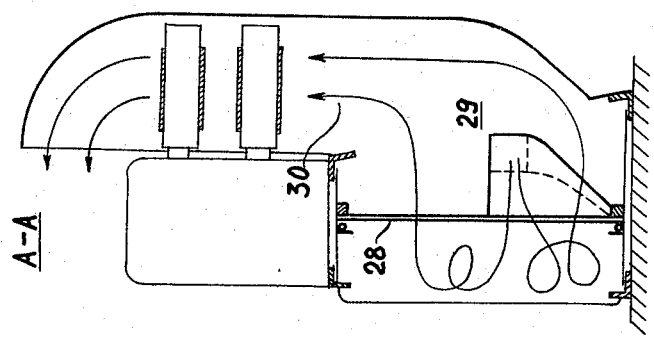
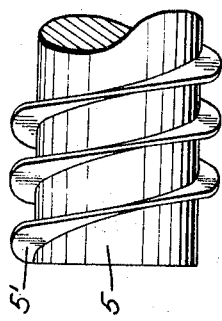
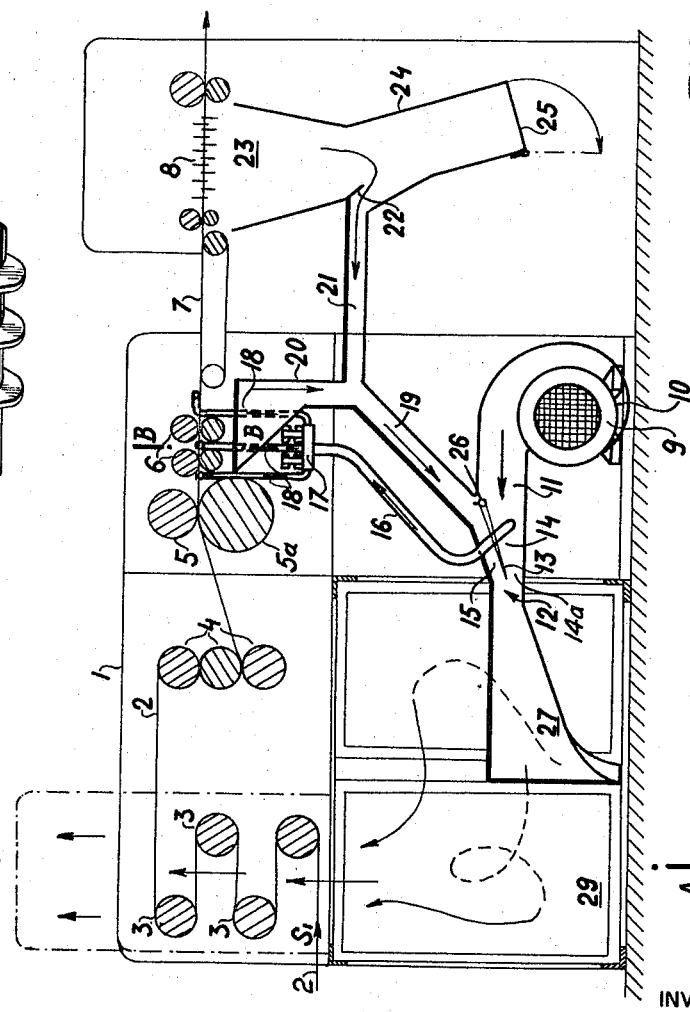
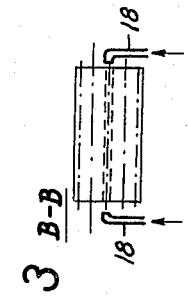

3,317,963
MACHINE FOR THE PRODUCTION OF A CONTINUOUS STAPLE FIBER PRODUCT FROM BUNDLES OF CONTINUOUS SYNTHETIC FILAMENTS
František Šob and František Weidenhöfer, Brno, Czechoslovakia, assignors to Elitex, Sdružení podniku textilního strojírenství, Liberec, Czechoslovakia
Filed June 2, 1964, Ser. No. 372,065
Claims priority, application Czechoslovakia, June 5, 1963, 3,233/63
7 Claims. (Cl. 19—.56)

The present invention is concerned with an improvement in machines for the production of a continuous staple fiber product from bundles of continuous synthetic filaments.

An important requirement for modern machines of that type is suitably for hot as well as cold processing of bundles of continuous synthetic filaments. During the hot processing of such bundles undesirable heating of the stretching cylinders used takes place, which may cause uncontrollable and harmful stretching of the bundle of continuous synthetic filaments that is processed. For this reason the stretching cylinders must be cooled and, indeed, most modern machines for producing a continuous staple fiber product from bundles of continuous synthetic filaments by hot processing are provided with an air cooling system.

Moreover, it is desirable to remove short staple fibers formed during cutting of the continuous filaments, dust particles and other impurities, especially from the zones of the loosening cylinders and combing mechanism, which is usually done by suction.

In view of the fact that cut fibers tend to run sideways in the zone of the loosening cylinders over the edges of these cylinders they must be maintained in the form of a web the width of which is for processing reasons slightly less than the width of the web in the combing zone. This can be done either mechanically by web condensers or more advantageously without mechanical contacting by air blasts from both sides, which has the added advantage of reducing undesirable effects caused by the development of static electricity.

None of the known machines for producing a continuous staple fiber product from continuous synthetic filaments is provided with a pneumatic system that would fulfill all the desired air actions. For instance, machines are known in which the cooling of the stretching cylinders and the blowing of air in the zone in which cut fibers are conveyed to the combing mechanism is done pneumatically, but these machines have no exhausting mechanism. Other machines of that type are known in which there are air-suction systems for removing dust in the combing zone, and a cooling system for the stretching cylinders, but in which there is no provision for supplying air in the zone in which cut fibers are transported to the combing mechanism. Finally, there exist machines for cool processing of bundles of continuous synthetic filaments, which are equipped with an air-exhausting system only.

Further, it is pointed out that all of the known machines which are equipped with both an exhausting and a cooling system use an independent fan for each of the two systems.

In the machine according to the present invention all the mentioned pneumatic actions, i.e. exhausting, blowing and cooling, are performed in a simple way, whereby the cooling action is carried out with filtered air.

The present invention provides that the machine for producing staple fiber yarns from continuous synthetic filaments is provided with a single pneumatic system which serves simultaneously four purposes. It sucks short staple fibers and impurities from the zones of the loosening cylinders and combing mechanism; it directs several air blasts at the loosening cylinders from both sides; and it cools the stretching cylinders. The pneumatic system according to the invention includes a single fan that blows atmospheric air into a duct which along a portion thereof (chamber) is divided by an adjustable flap into two channels one of which is referred to as an overpressure channel, the other being referred to as an underpressure channel. The overpressure channel is connected with nozzles for directing air at the loosening cylinders, and with the cooling system for the stretching cylinders, whereas the underpressure channel is connected to two suction devices for sucking loose and short fibers and impurities from the loosening cylinders and combing mechanism. The cooling system for the stretching cylinders is equipped with a mechanical filter.

Further advantages and details of the present invention will be seen from the following description as well as the accompanying drawing in which:

FIG. 1 is a longitudinal section of a diagrammatical front elevation of an embodiment of the machine of the invention;

FIG. 2 is a cross section of the machine in front elevation along the line A—A of FIG. 1;

FIG. 3 is a cross section of the machine along the line B—B in FIG. 1; and

FIG. 4 is a fragmentary side view to a larger scale of a detail of the machine, shown in FIG. 1.

Referring to the drawing in greater detail, the machine as illustrated includes a frame 1 in the upper part of which are mounted to succeed one another in the moving direction of a bundle of continuous synthetic filaments when fed into and through the machine in the direction of arrow $S_1$. The machine comprises further a system of stretching cylinders 3, a system of restraining cylinders 4, a pair of cutting cylinders 5, 5a, several pairs of loosening cylinders 6, a conveyer belt 7, and a two-sided combing mechanism 8. Out of the cutting cylinders 5, 5a, cylinder 5 has on its surface a cutting ridge 5' in form of a helix, while cylinder 5a has a smooth surface. As the cylinders rotate the helical cutting ridge 5 intersects, and cuts in cooperation with the cylinder 5a, the traveling filaments.

In the lower part of the machine frame 1 there is a pneumatic system which includes a fan 9 that is driven by an electric motor (not shown) and sucks air from the atmosphere through a sucking opening 10 to be blown through a duct 11 to a chamber 12. The length of the chamber 12 is divided by an adjustable flap 13 into an overpressure channel 14 and an underpressure channel 15. From the overpressure channel 14 air under pressure flows through a duct 16 and a distributing and control mechanism 17 of known construction to nozzles 18 which are provided on both sides of the loosening cylinders 6. The duct 16 is referred to in the claims as overpressure branch duct means. There are a first suction duct 20 and a second suction duct 21, which lead away from the loosening cylinders 6 and the combing device 8, respectively. These two ducts continue as a combined suction duct 19 which leads into the underpressure channel 15. Cut and loose short staple fibers and impurities are sucked from the loosening cylinders 6 through the first motion duct 20, while the second suction duct 21 is connected around a baffle member 22 with a suction head 23. Through the suction head 23 short staple fibers and other impurities are sucked from the combing mechanism 8. The suction head 23 continues at its bottom as a separating chamber 24 provided with a discharging flap 25.

A constricted portion 14a of the overpressure channel 14 produces underpressure in the underpressure channel 15. The degree of underpressure is controllable by adjusting the flap 13 which is rotatable about a pin 26.

Both air under pressure coming from the fan 9 and moving through the duct 11 and the overpressure channel 14 of the chamber 12, and air with impurities sucked through the underpressure channel 15 move on through a channel 27 to a mechanical filter 28 (see FIG. 2) behind which an equalizing chamber 29 is located. Filtered clean air 30 under pressure is guided to the stretching cylinders 3 to cool same.

The device works as follows:

A bundle 2 of hot processed and, therefore, still hot continuous synthetic filaments is fed into and through the machine in the direction of the arrow $S_1$ and passes first through a system of stretching cylinders 3, where stretching of the bundle 2 takes place, and from there to a system of restraining cylinders 4 which prevents back movements of the bundle 2. The bundle is cut between the pair of cutting cylinders 5 into staple fibers which pass in form of a web through pairs of loosening cylinders 6 and are oriented. The belt conveyor 7 carries the hitherto insufficiently cohesive fiber web into the combing device 8, for instance, a two-sided combing mechanism, wherein the web is combed and further adjusted. The web is then discharged for further processing which generally consists in condensing the web into yarn, in twisting the staple fiber yarn, and in winding.

The bundle of continuous synthetic filaments which is converted in the machine into staple fiber yarn enters the machine at temperatures of up to 190° C. and is cooled by clean filtered air in the equalizing chamber 29 in order to prevent the material from being overstretched by the stretching cylinders 3.

The cut fibers are prevented from running over the edges of the loosening cylinders 6 by air jets from the nozzles 18, directed against the sides of the opening cylinders, as can best be seen in FIG. 3. Air under pressure is supplied to these nozzles by the distributing and control mechanism 17.

During the cutting of the continuous filaments by the cutting cylinders 5 short fibers form which are undesirable because they are not long enough to be bound into the final yarn and would cause irregularities in the yarn that is being produced. Such short fibers, dust, and other impurities are removed in the zones of the loosening cylinders 6 and combing device 8 as thoroughly as possible. The removal is effected by sucking air through the first suction duct 21 and the suction head 23. The sucking effect is produced by a Venturi tube-like shape of the overpressure channel. The increased velocity of the air under pressure, as it passes through the constricted passage 14a of the overpressure channel 14 produces the desired suction effect. The baffle member 22 is provided to prevent the horizontal second suction duct 21 from becoming congested by entrained impurities sucked from the zone of the combing device 8. Sucked air flowing through the suction head 23 in a downward direction is urged to make a sharp curve around the baffle 22 whereby a separation of the entrained matter is effected and the separated impurities are caused to drop down in the separating chamber 24.

What is claimed is:
1. A machine for the production of a continuous staple fiber product from bundles of continuous synthetic filaments, comprising
   (a) means for cutting a bundle of continuous synthetic filaments,
   (b) means for loosening the cut filaments or a continuous product containing staple fibers,
   (c) means for combing said product, and
   (d) a pneumatic system comprising
      (1) means for producing a current of air,
      (2) duct means for said air current,
      (3) flow means within said duct means, dividing a length of said duct means into an overpressure and an underpressure channel,
      (4) means associated with said duct means and flow means for producing suction,
      (5) suction duct means leading away from said loosening means and combing means and joining said underpressure channel, and
      (6) overpressure branch duct means diverging from said overpressure channel and leading to said loosening means.

2. In the machine according to claim 1, means for stretching said bundle prior to its being cut, filter means ahead of said stretching means when viewing in the direction of said air current, said overpressure and underpressure channels continuing as a common overpressure duct for cooling air, said common overpressure duct carrying cooling air to said filter means and toward said stretching means.

3. In the machine according to claim 1, said overpressure branch duct means including a plurality of supply lines and nozzles to direct air under pressure toward said product in the zone of said loosening means.

4. In the machine according to claim 1, means for transporting said product from said loosening means to said combing means.

5. In the machine according to claim 1, said suction duct means including first, second, and combined suction duct means, said first and second suction duct means leading away from said loosening and combing means, respectively, and joining each other to form said combined suction duct means, said combined suction duct means joining said underpressure channel.

6. In the machine according to claim 1, said overpressure channel having a flow-constricting shape and acting as said suction-producing means.

7. In the machine according to claim 6, said flow means being adjustable.

References Cited by the Examiner
UNITED STATES PATENTS

| | | | |
|---|---|---|---|
| 2,077,283 | 4/1937 | Taylor et al. | 19—.35 X |
| 2,197,857 | 4/1940 | Finlayson et al. | 19—.64 |

MERVIN STEIN, *Primary Examiner.*

P. C. FAW, I. C. WADDEY, *Assistant Examiners.*